(12) United States Patent
Kim

(10) Patent No.: US 7,871,724 B2
(45) Date of Patent: Jan. 18, 2011

(54) CYLINDRICAL RECHARGEABLE BATTERY AND METHOD OF FORMING THE SAME

(75) Inventor: Dae Kyu Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1228 days.

(21) Appl. No.: 11/411,998

(22) Filed: Apr. 25, 2006

(65) Prior Publication Data
US 2006/0286447 A1     Dec. 21, 2006

(30) Foreign Application Priority Data
Apr. 27, 2005    (KR) .................... 10-2005-0035287

(51) Int. Cl.
  *H01M 1/26*    (2006.01)
  *H01M 2/08*    (2006.01)
  *H01M 1/04*    (2006.01)
(52) U.S. Cl. .................. 429/179; 429/166; 429/211; 429/170
(58) Field of Classification Search .............. 429/166, 429/211, 170, 161, 178–180, 127, 168, 64; 29/623.1–623.5, 729–731, 745–748
See application file for complete search history.

(56) References Cited

U.S. PATENT DOCUMENTS

2002/0094477 A1* 7/2002 Sasaki et al. ................. 429/161
2005/0191551 A1* 9/2005 Tsujimoto et al. ........... 429/224
2006/0172190 A1* 8/2006 Kaplin et al. ................ 429/161

FOREIGN PATENT DOCUMENTS

| JP | 48-4844 | 2/1973 |
| JP | 50-110038 | 8/1975 |
| JP | 52-167530 | 12/1977 |
| JP | 4-116360 | 10/1992 |
| JP | 2000-58024 | 2/2000 |
| JP | 2001-135299 | 5/2001 |
| JP | 2004-071335 | 3/2004 |

OTHER PUBLICATIONS

Patent Abstracts of Japan, Publication No. 2001-135299, dated May 18, 2001, in the name of Takami Saito.
Patent Abstracts of Japan, Publication No. 2000-058024, dated Feb. 25, 2000, in the name of Koichi Nishiyama et al.

* cited by examiner

*Primary Examiner*—Patrick Ryan
*Assistant Examiner*—Stephen Yanchuk
(74) *Attorney, Agent, or Firm*—Christie, Parker & Hale, LLP

(57) ABSTRACT

A rechargeable battery and a method of forming the rechargeable battery. An electrode assembly includes a first electrode and a second electrode, and a separator disposed between the first electrode and the second electrode to prevent a short circuit between the first electrode and the second electrode. A first electrode tap is formed on an end portion of the first electrode and a second electrode tap is formed on an end portion of a second electrode, each end portion being absent active materials. A can is adapted to receive the electrode assembly and have the electrode assembly welded to an inner side of the can. A cap assembly surrounded by a gasket insulates the cap assembly and seals an opening of the can.

7 Claims, 10 Drawing Sheets

CYLINDRICAL RECHARGEABLE BATTERY AND METHOD OF FORMING THE SAME

CROSS-REFERENCE TO RELATED APPLICATIONS

This application claims priority to and the benefit of Korean Patent Application No. 10-2005-0035287, filed on Apr. 27, 2005, in the Korean Intellectual Property Office, the entire content of which is incorporated herein by reference.

BACKGROUND OF THE INVENTION

1. Field of the Invention

The present invention relates to a coupling structure of a tap and a can in a rechargeable battery and a method of forming the rechargeable battery.

2. Description of Related Art

Since rechargeable batteries have many advantages such as rechargeability, miniaturization, and high capacity, there has been rapid development of rechargeable batteries as they have become more widely used in recent years. Rechargeable batteries can be classified into nickel-hydrogen (Ni-MH) batteries and lithium ion (Li-ion) rechargeable batteries depending on electrode active materials.

A liquid electrolyte, solid polymer electrolyte, or gel type electrolyte can be used as the electrolyte of the lithium rechargeable battery. Also, lithium rechargeable batteries can be classified into can types and pouch types depending on the container into which an electrode assembly is inserted.

In can type lithium rechargeable batteries, the electrode assembly is located in a can formed from metallic materials such as aluminum-containing metal by the use of a deep drawing method and the like. Typically, liquid electrolyte is used in can type rechargeable batteries.

Can type rechargeable batteries can be further classified into polygonal can types and cylindrical can types. The polygonal can type is formed from a container in a hexahedron shape or in a thin shape in which the edges of the hexahedron are rounded. The cylindrical can type is widely used in high-capacity electronic and electrical devices, in which a plurality of rechargeable batteries are combined into a single battery pack.

FIGS. 1 and 2 are a front cross-sectional view and an exploded perspective view, respectively, illustrating a structure of a conventional cylinder type rechargeable battery and a method of forming a cylinder type rechargeable battery will be described with reference to FIGS. 1 and 2. First, two electrodes 25 having a rectangular plate shape and separators 21, 23 interposed between the electrodes 25 to prevent short circuits between the two electrodes 25 are stacked and wound in a jelly roll configuration to provide an electrode assembly 20. Each electrode is formed by coating active material slurry on a charge collector made of a metallic foil.

Uncovered areas absent the slurry are located at either end of the charge collector. The uncovered areas are provided with electrode taps 27, 29 for each electrode plate. The electrode taps 27, 29 are electrically connected to a cylindrical can 10 and a cap assembly 80 insulated from the cylindrical can 10 to form a part of a path for connecting the electrode assembly to external circuits during charging and discharging of the rechargeable battery. From the electrode assembly 20, one electrode tap is drawn upward to an opening of the cylindrical can 10 and the other electrode tap is drawn downward.

The electrode assembly is inserted into the cylindrical can 10 through the opening with upper and lower insulating plates 13a, 13b. Then, beads for preventing floating of the electrode assembly in the can are formed in the cylindrical can 10 and electrolyte is injected into the cylindrical can 10. An insulating gasket 30 is provided on the inner side of the can in the vicinity of the opening and a cap assembly 80 for capping the opening is provided on the inside of the gasket 30.

In the cap assembly 80, a bent assembly, a positive thermal coefficient (PTC) element 60, and a cap-up 70 having an electrode terminal are included. The bent assembly typically includes a bent 40 at the lower side and a current interrupt device (CID) 50 which would be fractured in combination with the bent 40 to cut off a current path.

Subsequently, clamping work is performed to seal the cylindrical can 10 by pressing the sidewall of the opening of the cylindrical can 10 toward the center of the can using the cap-up 70 inserted into the gasket 30 as a stopper. In addition, tubing work is performed to form an exterior of the battery.

In connecting the electrode taps 27, 29, the electrode tap 29 extending downward is welded to a bottom surface of the cylindrical can with the lower insulating plate 13b therebetween and the electrode tap extending upward 27 is welded to the bent 40 through a hole in the upper insulating plate 13a.

The upward electrode tap 27 has a length sufficient to easily weld the upward electrode tap 27 and a protrusion 42 of the bent 40 to each other. The electrode tap 27 is bent and the bent assembly is inserted into the opening of the cylindrical can in which the gasket 30 is provided. This work requires a space between the bent assembly and the electrode assembly 20.

Since extra length of the upward electrode tap 27 is difficult to dispose after welding, the length of the upward electrode tap is determined in a workable range. The portion of the upward electrode tap 27 remaining after welding may be positioned in a space between the cap assembly and the electrode assembly. The upper insulating plate 13a may serve to prevent a short circuit between the upward electrode tap 27 and the other electrode 25 of the electrode assembly.

A center pin 18 shown in FIG. 2 may be provided in a hollow for winding the electrode assembly 20.

In welding the downward electrode tap 29, in the partial section shown in FIG. 3, the electrode assembly 20 is inserted into the cylindrical can 10. Resistance welding is then performed by inserting a welding rod 115 into a hollow space at the center of the electrode assembly 20 and allowing current to flow in the welding rod 115 such that the electrode tap 29 comes in close contact with the bottom surface of the can 10. A welding point 291 is formed at a position between the electrode tap 29 and the can 10 with which the narrow end of the welding rod 115 comes in contact. Since the welding rod 115 is inserted into a small space at the center of the electrode assembly for the welding, it is difficult to perform the welding while moving the welding rod. Thus, a one-point welding 291 is performed.

A strong weld is typically needed between the electrode taps of the electrode assembly and the safety bent or the can. If the weld is not strong, the electrical connection between the electrode tap and the safety bent or the can is often made through a surface contact. The electrical connection with the surface contact generates contact resistance which is greater than the welding resistance. Accordingly, the internal resistance of the battery increases and the charging and discharging efficiency decreases.

Specifically, in case of the one-point welding on the bottom surface of the can, the strength against tension easily satisfies a predetermined criterion. However, when the electrode assembly rotates inside the can, the strength against the rotation is very weak because there is only one welding point formed at the center of the electrode assembly. Accordingly, the weld may be destroyed, rapidly increasing the internal resistance. Thus, there is a need for a rechargeable battery in which the reliability of the electrical connection between the bottom surface of a can and a downward electrode tap is improved.

SUMMARY OF THE INVENTION

A rechargeable battery and a method of forming the rechargeable battery are provided in which the strength of the weld between the bottom surface of a can and a downward electrode tap is increased and low inner resistance of a connection portion can be maintained to enhance a charging and discharging efficiency and to increase an amount of discharge.

According to an exemplary embodiment of the present invention, a rechargeable battery includes an electrode assembly having two electrodes in which electrode taps are formed and a short circuit prevention separator disposed between the two electrodes. The rechargeable battery also includes a can which receives the electrode assembly and a cap assembly which caps the can, the cap assembly having a gasket at an opening of the can. One electrode tap is bent inside the can and is welded to the inner side at one or more points and another electrode tap is welded to the bottom surface of the can at one or more points.

The electrode tap to be welded to the inner side of the can may be folded inside the rechargeable battery two or more times. The electrode tap to be welded to the bottom surface of the can protrudes from the lower end of the electrode assembly, is bent upward, is bent downward again at the upper portion of the can, is bent again at the lower end of the electrode assembly, and then is welded to the bottom surface of the can at two or more points. The upper portion of the can where the electrode tap is bent indicates the portion than the center of the height of the sidewall. The electrode tap may be bent at the top end of the can.

If the length of a portion of the electrode tap other than the portion in contact with the bottom surface of the can or the portion parallel to the bottom surface is equal to the length of the portion of the electrode tap between the sidewall of the can and the sidewall of the electrode assembly, the length of the portion of the electrode tap may be greater than the height of the inner side of the can and less than double the height of the inner side of the can. When the electrode tap is welded to the sidewall of the can without the portion parallel to the bottom surface of the can, the length of the electrode tap extending downward from the electrode assembly is greater than the height of the can and smaller than double the height of the can.

According to another embodiment of the present invention, a method of forming a rechargeable battery is provided, the method including inserting an electrode tap of an electrode assembly into a can, locating a body of the electrode assembly outside the can, and then welding the inserted electrode tap to the inner side of the can at two or more points; and bending the welded electrode tap and inserting the electrode assembly including all the electrode tap into the can.

In the method, after welding the electrode tap, a lower insulating plate is disposed on the bottom surface and then the electrode assembly is inserted into the can.

DETAILED DESCRIPTION OF THE INVENTION

First, a method of forming a rechargeable battery according to the present invention will be described. Similarly to the conventional method, two electrodes having a rectangular plate shape are stacked and wound in a jelly-roll configuration to form an electrode assembly. Since separators are disposed between and above or below the two electrodes, the separator is located such that it prevents a short circuit between the two electrodes.

The electrode plate is formed by coating a charge collector of a metallic foil or aluminum or copper mesh with an active material slurry. The slurry is typically made by agitating a granular active material, a subsidiary conductor, a binder, and a plasticizer in a solvent added thereto. The solvent is removed in the subsequent process of forming electrodes.

Uncovered areas absent the slurry exist are located at either end of the charge collector in a direction in which the electrode plates are wound. The uncovered areas are provided with electrode taps for each electrode plate. As seen in the exemplary embodiment shown in FIG. 4, one electrode tap 127 is drawn upward and the other electrode tap 129 is drawn downward. The electrode tap 129 is electrically connected to a cylindrical can 10. The electrode tap 127 is electrically connected to a cap assembly (not shown) insulated from the cylindrical can 10 to form a part of a path for connecting the electrode assembly to external circuits during charging and discharging of the rechargeable battery.

Figure 5:
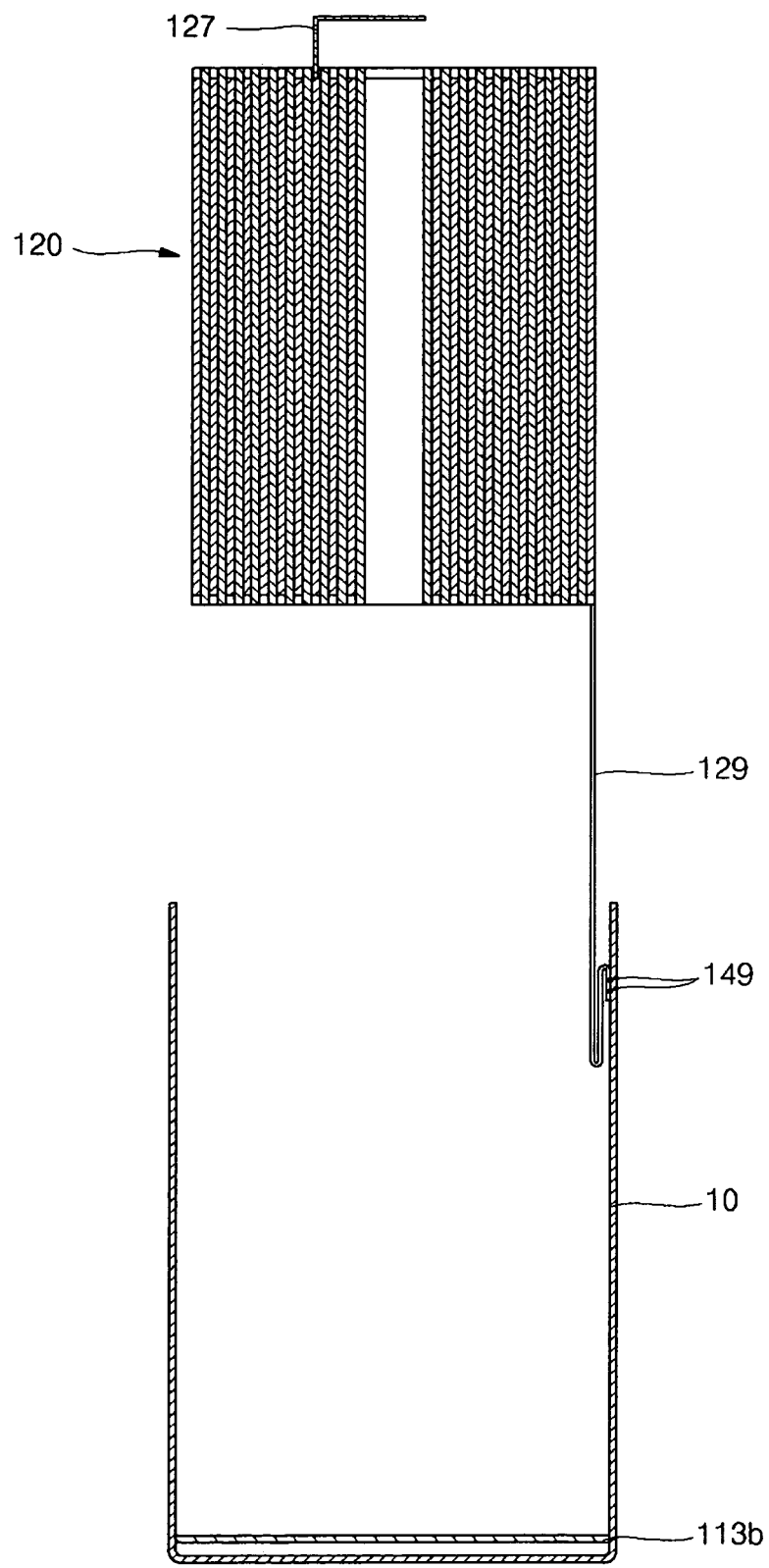
FIG. 5 is a cross-sectional view illustrating bending the electrode tap of FIG. 4.
Figure 6:
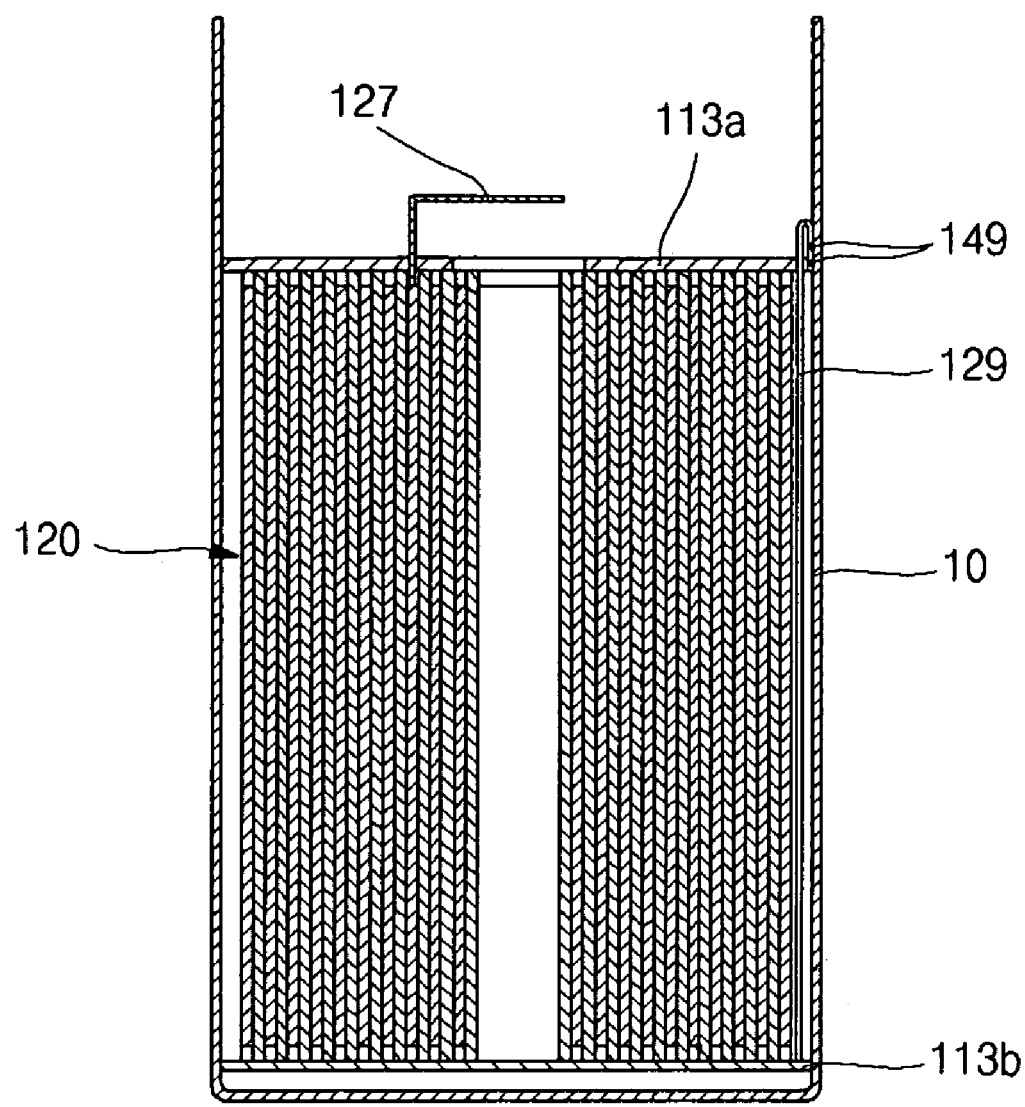
FIG. 6 is a cross-sectional view of the electrode assembly of FIG. 4 inserted into a can.

The can is formed out of iron, aluminum alloy, or the like by the use of a deep drawing method. Subsequently, as shown in FIGS. 4 to 6, a process of coupling the electrode assembly 120 and the can 10 including a process of welding the electrode tap 129 is performed.

Figure 1:
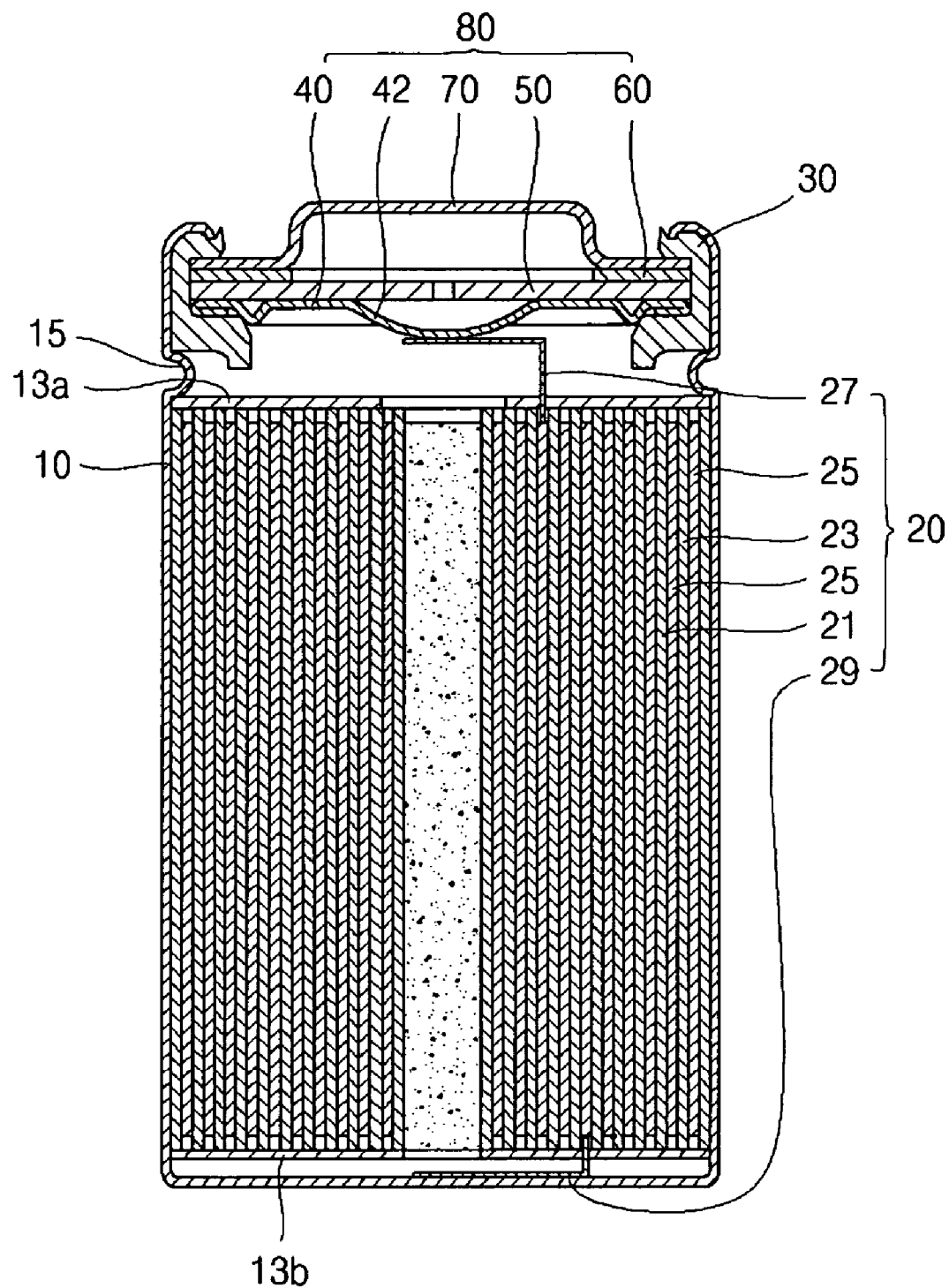
FIG. 1 is a front cross-sectional view illustrating a structure of a conventional cylinder type rechargeable battery.
Figure 2:
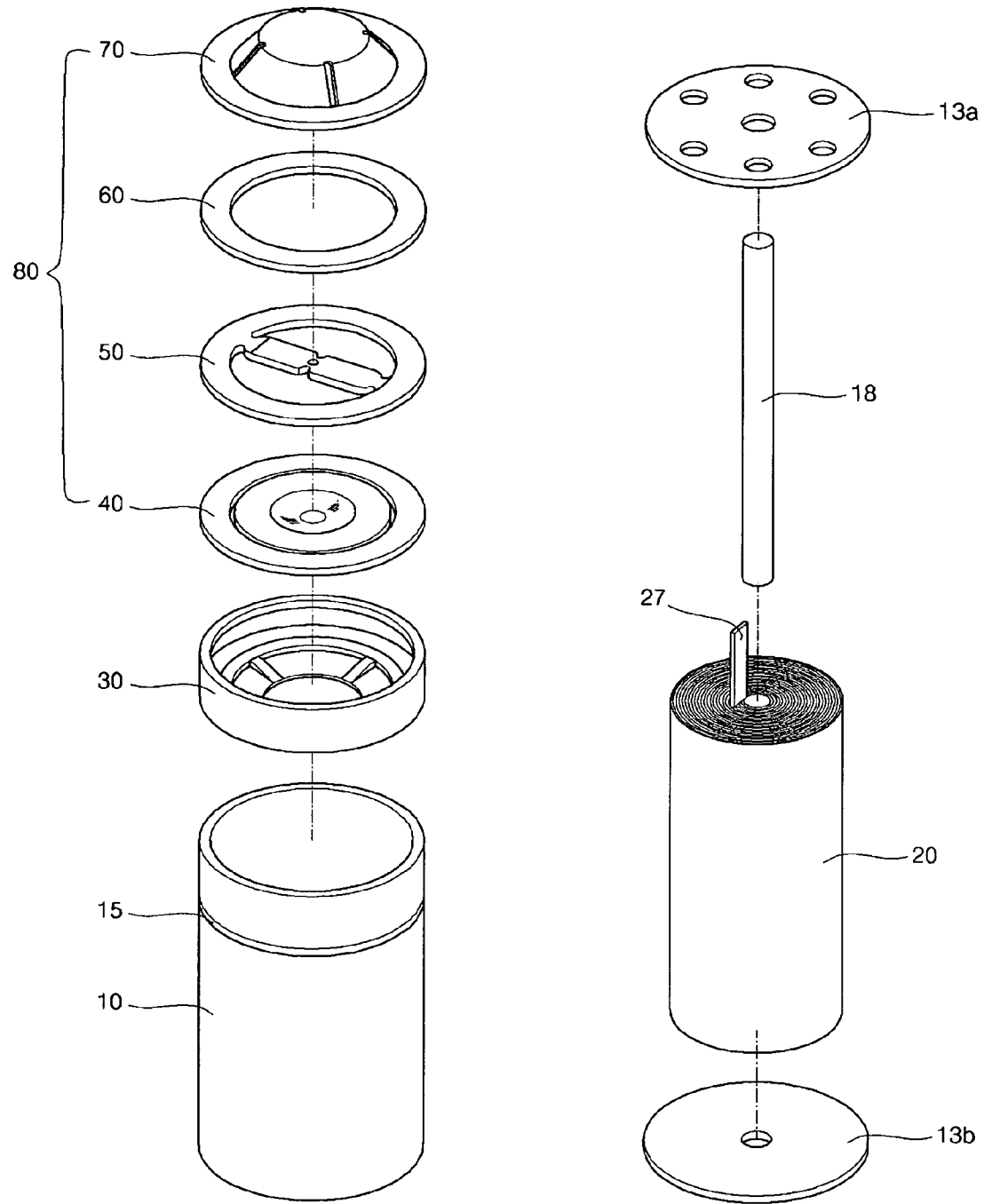
FIG. 2 is an exploded perspective view illustrating the structure of the rechargeable battery of FIG. 1.
Figure 3:
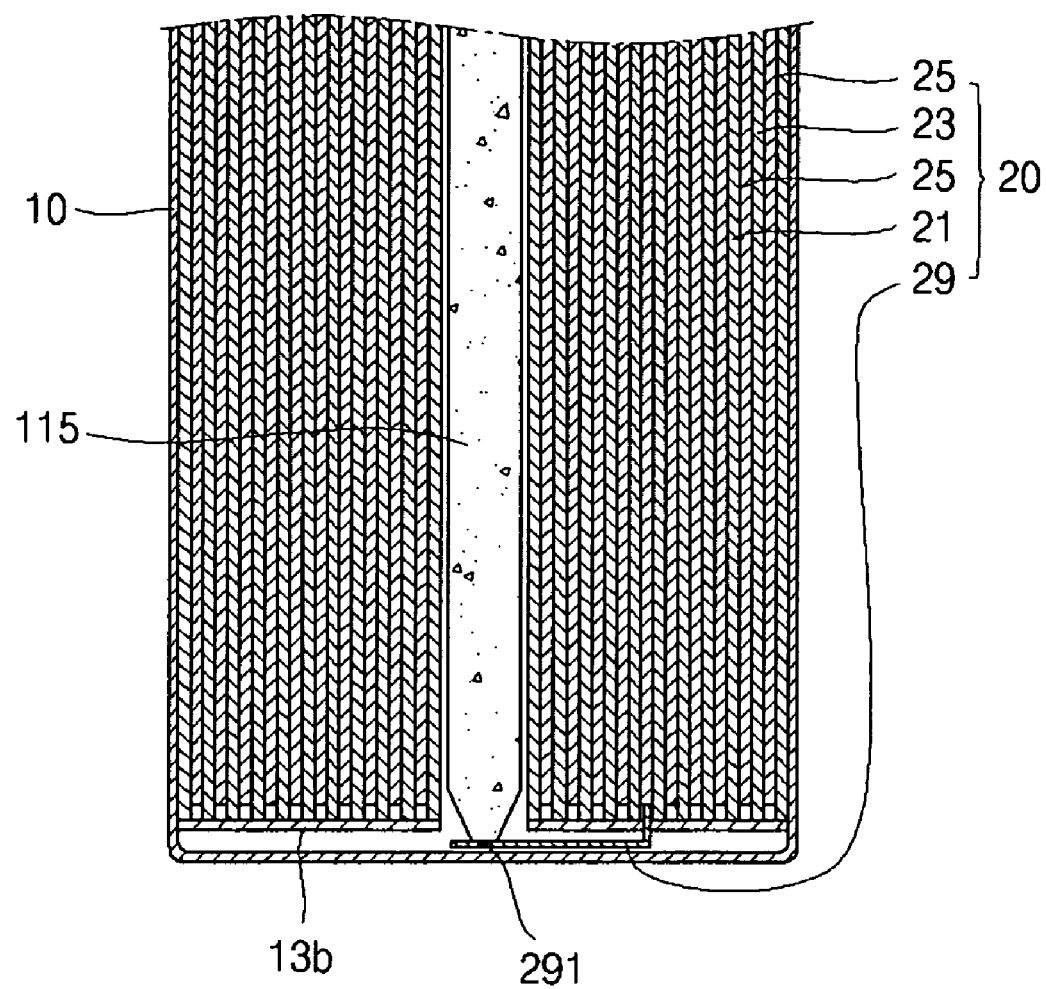
FIG. 3 is a partial cross-sectional view illustrating an electrode tap being welded to the bottom surface of a can in the conventional cylinder type rechargeable battery of FIG. 1.
Figure 4:
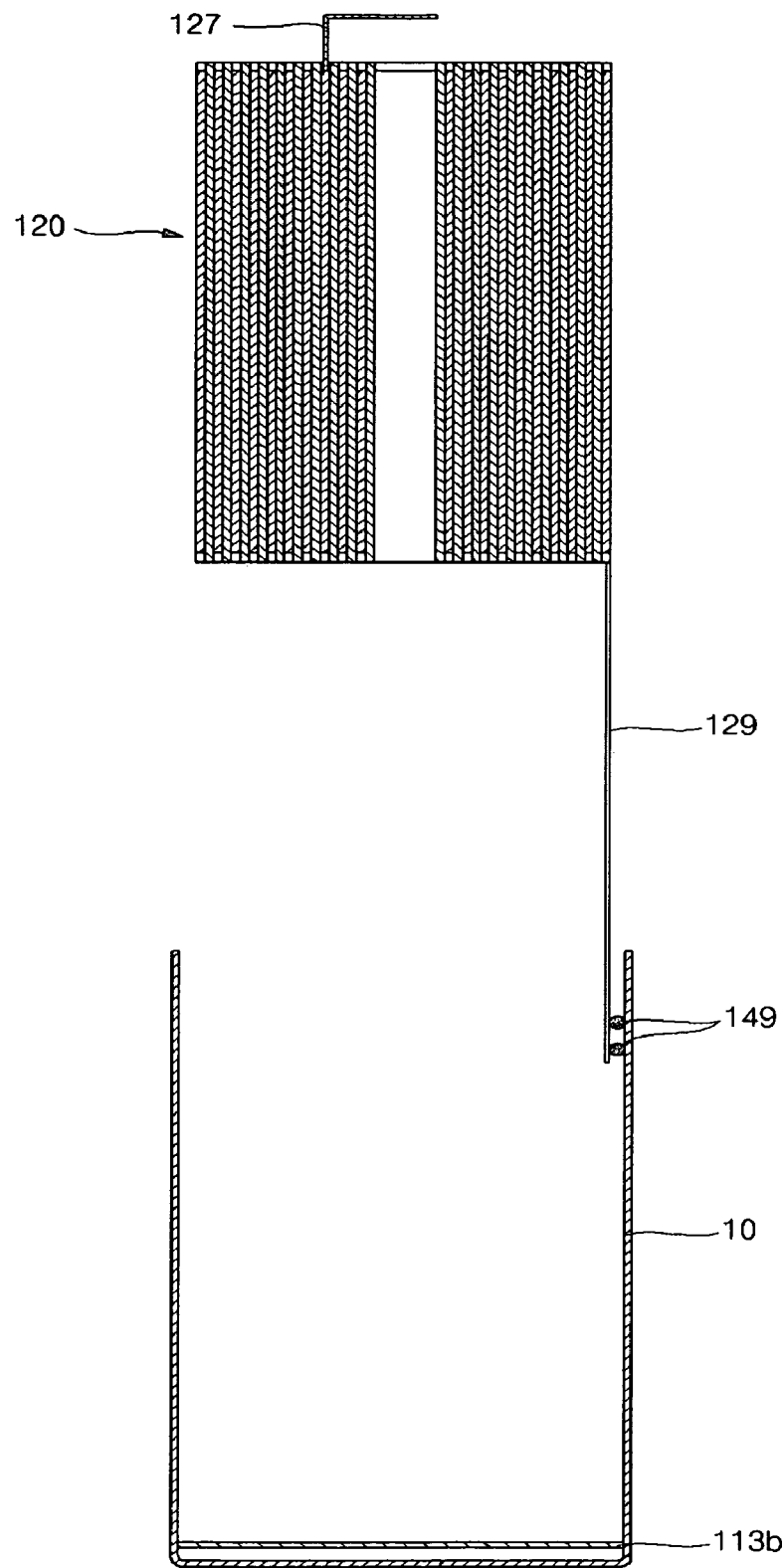
FIG. 4 is a cross-sectional view illustrating welding an electrode tap of an electrode assembly to a can according to an embodiment of the present invention.

First, as shown in FIG. 4, the electrode assembly 120 from which the electrodes taps 127, 129 are drawn upward and downward, respectively. One end of the electrode tap 129 is connected to an electrode at the outermost part of the electrode assembly 120 and the other end is to be securely welded to an upper end portion of the sidewall of the can at two or more welding points 149 in parallel.

As shown in FIG. 4, a lower insulating plate 113b may be first provided on the bottom surface of the can 10. Then, as shown in FIG. 5, the electrode assembly 120 is inserted into the can 10 such that a portion of the electrode tap 129 is folded onto itself. Finally, as shown in FIG. 6, the electrode tap 129 is located in the space between the electrode assembly 120 and the sidewall of the can 10 such that the electrode tap 129 is folded in part. In a rechargeable battery having a space between the electrode assembly and the can, the folded electrode tap may serve to prevent the electrode assembly from moving within the can.

Figure 7:
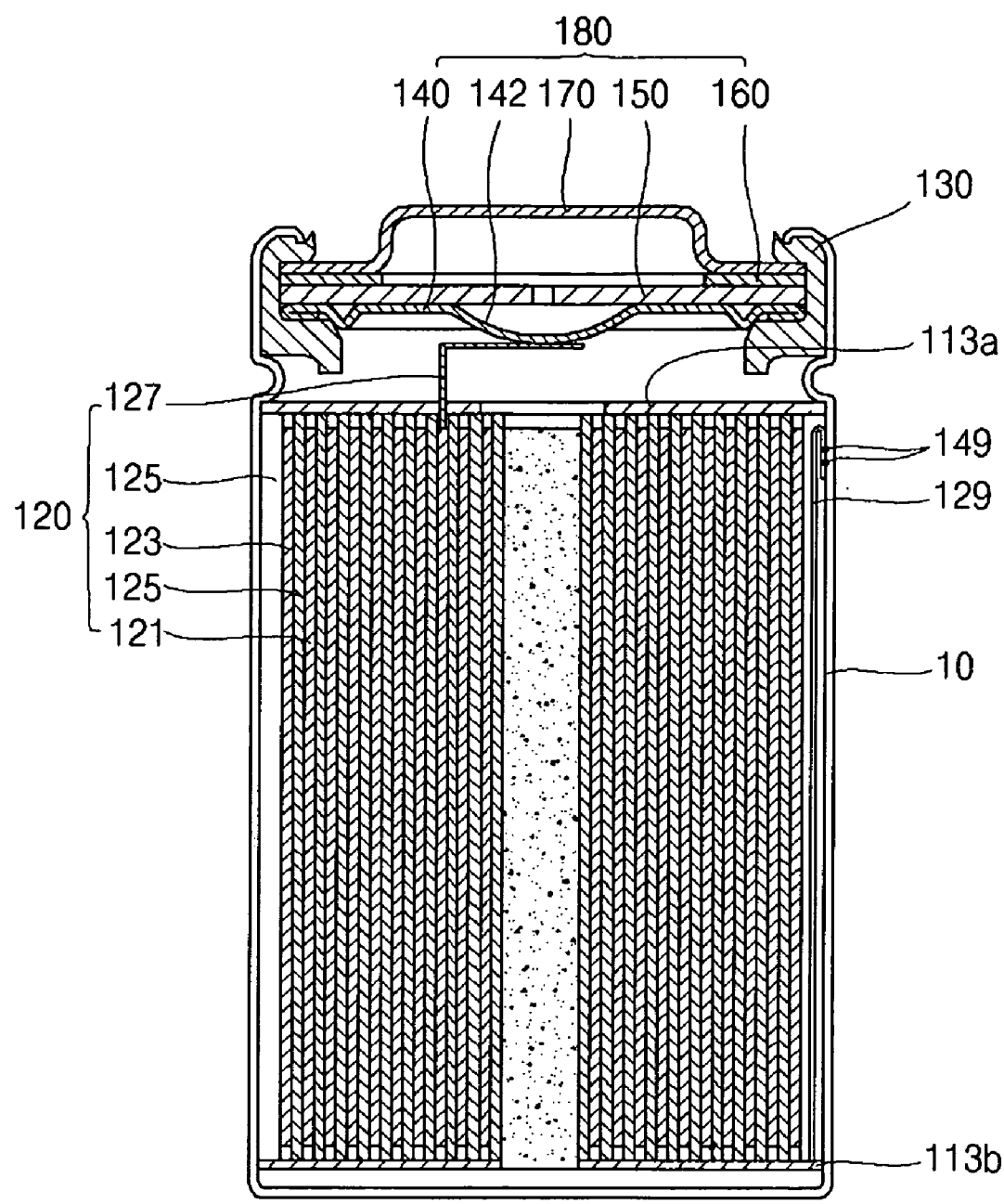
FIG. 7 is a front cross-sectional view of a rechargeable battery according to an exemplary embodiment of the present invention.

FIG. 7 depicts a fully assembled rechargeable battery according to an exemplary embodiment of the present invention.

The electrode assembly 120 is inserted into the can 10 and the upper insulating plate 113a is located on the electrode assembly. The upward electrode tap 127 is protruded through a hole of the upper insulating plate to prevent the electrode assembly from floating. Subsequently, clamping the sidewall of the can by pressing a part of the sidewall of the can toward the center of the can is carried out.

Electrolyte solution is injected into the can 10 in which the electrode assembly 120 has been installed and the gasket 130 is inserted into the upper opening of the can to contact the sidewall of the can.

The cap assembly 180 as described above is provided inside the gasket 130. A bent having a connection portion protruding downward from the central portion is positioned at the lowermost side. A current interrupt device (CID) 150 which would be deformed broken down with the upward deformation of the electrical connection portion 142 of the vent 140 due to the internal pressure is provided above the vent 140. A positive thermal coefficient (PTC) element 160 connected to the CID 150. The PTC element 160 cuts off a current path in the battery when the battery is overheated. A cap-up 170 having an electrode terminal protruded outward to provide an electrical connection to external devices is provided above the PTC element 160. Instead of the PTC element 160 or above the PTC element, an additional protection circuit board may be further provided.

To install the cap assembly 180, the gasket 130 is first located on the cap assembly 180 and the upward electrode tap 27 is then welded to the connection portion 142 protruding downward in the safety vent 140. The welding is carried out at two or more points apart from each other to enhance the welding strength which provides greater resistance to rotation of the electrode assembly 120.

When the elements of the cap assembly 180 are inserted into the gasket, a clamping work is carried out. Subsequently, a tubing work including coating the outside with a sheathing material is carried out.

Figure 8:
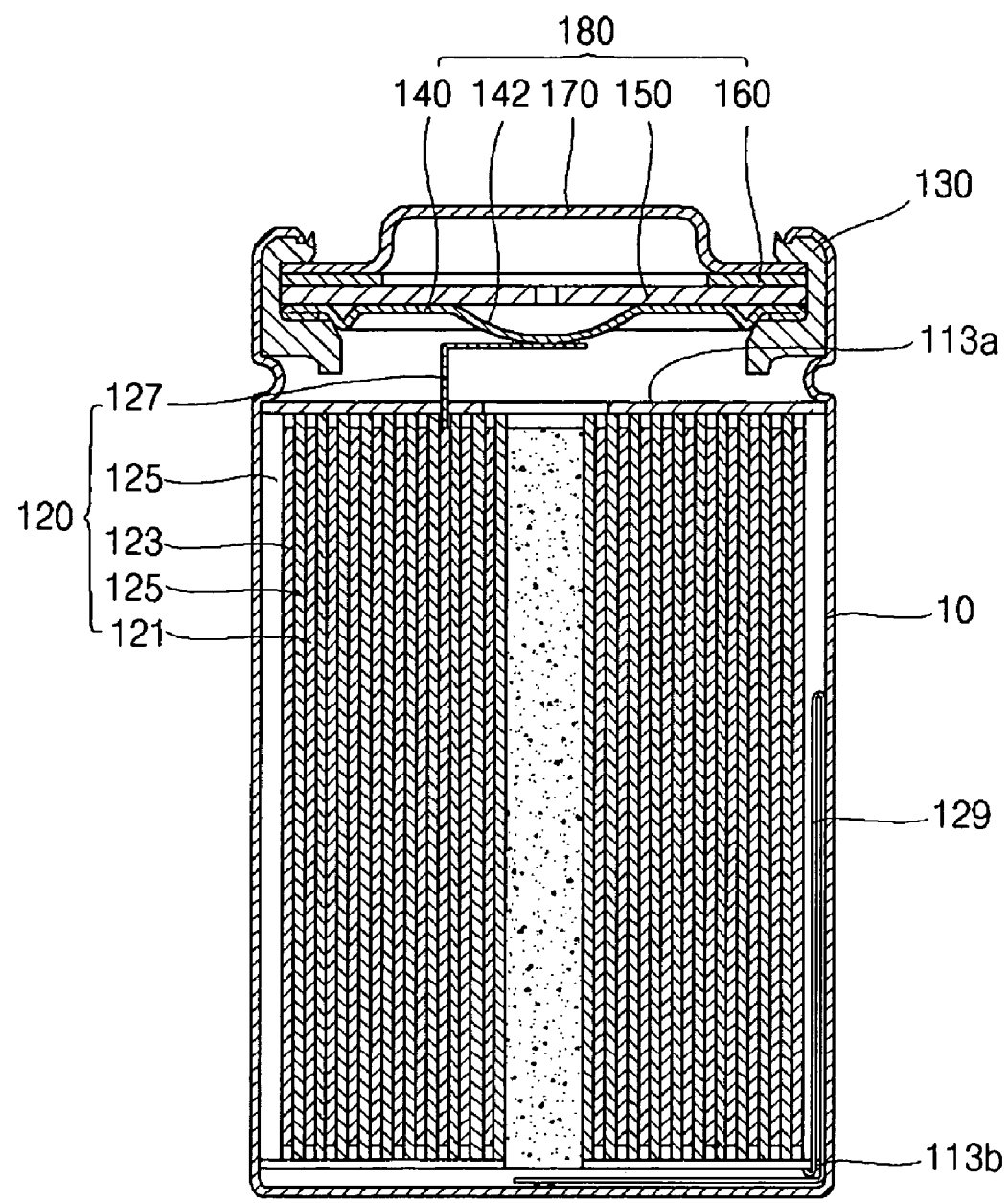
FIG. 8 is a front cross-sectional view of a rechargeable battery according to another exemplary embodiment of the present invention.

According to another exemplary embodiment of the present invention as shown in FIG. 8, the downward electrode tap 129 is bent at one portion and may be divided into a portion parallel to the sidewall of the can and an end portion parallel to the bottom surface of the can. The portion parallel to the sidewall of the can has a length corresponding to about one and half times the height of the sidewall of the can and the end portion parallel to the bottom surface of the can has a length substantially corresponding to the radius of the bottom surface of the cylindrical can.

The end portion of the electrode tap parallel to the bottom surface of the can is first inserted into the can and is brought into contact with the bottom surface of the can. The end portion of the electrode tap is welded to the bottom surface of the can at two or more separate points. In the past, only the central portion of the bottom surface of the can was welded. However, in the present embodiment, the welding work is performed symmetrical to both sides of the center of the bottom surface of the can or to a plurality of points with a constant interval in between the points. The welding work may be carried out by laser welding, ultrasonic welding, or resistance welding, depending upon the material of the electrode tap.

When the downward electrode tap 129 and the can 10 are welded to each other, the lower insulating plate 113b is inserted into the can before the electrode assembly is inserted. The lower insulating plate 113b serves to prevent short circuits between the two electrodes 125 due to the electrical connection between the electrode assembly 120 and the electrode tap 129 or between the electrode assembly 120 and the bottom surface of the can.

The electrode assembly 120 is then inserted into the can 10. Since the electrode tap 129 protruding from the lower end of the electrode assembly is longer than the sidewall of the can 129, the electrode tap may be folded such that the electrode assembly 120 is completely insertable into the can 10. When a portion of the electrode tap 129 protruding downward is folded onto itself, the end portion of the electrode tap is positioned below. The electrode tap 129 is then folded onto itself again. The whole electrode tap 129 is received in the can 10 in this folded state. The folded portion is positioned above the center of the can when the electrode assembly 120 is inserted into the can 10.

When the length of the electrode tap 129 other than the end portion is less than the height of the sidewall of the can, a part of the electrode assembly may be located on the inside of the can to hinder the welding work between the end portion of the electrode tap and the bottom surface of the can. Accordingly, the electrode tap 129 should have a length greater than the height of the sidewall of the can.

Figure 9:
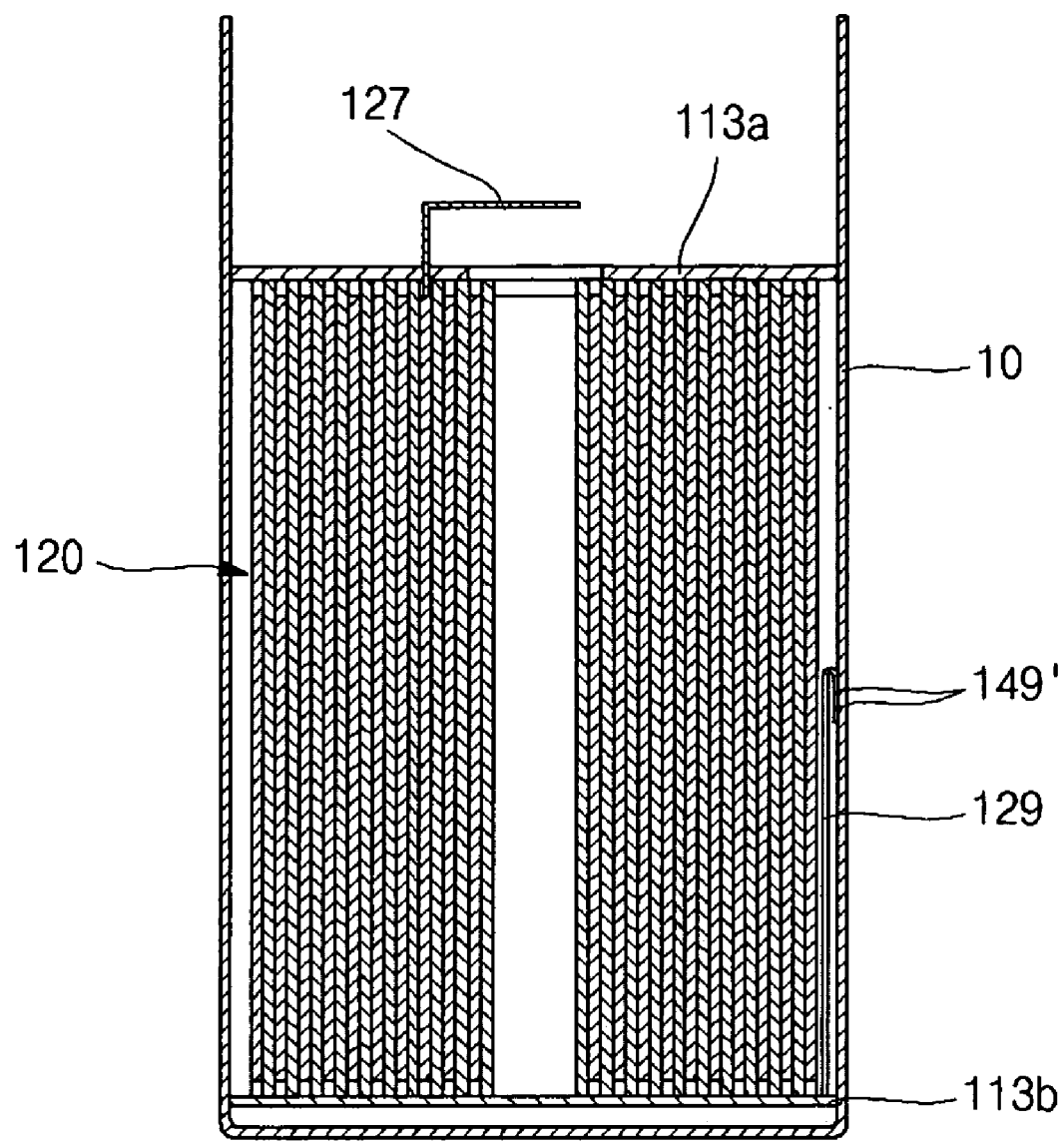
FIGS. 9 and 10 are cross-sectional views illustrating alternative embodiments of the electrode assembly coupled to the can according to the present invention.

On the other hand, in a further exemplary embodiment as shown in FIG. 9, the end portion of the electrode tap 129 can be welded to the sidewall of the can at two or more welding points 149' which are positioned at the central portion of the sidewall of the can. In this case, the length of the electrode tap 129 is not necessarily greater than the height of the sidewall of the can 10. That is, the electrode tap 129 may be welded to the central portion of the sidewall of the can 10 and has a length sufficient to prevent the electrode assembly 120 from entering the can 10 during the welding work. Additionally, the length of the electrode tap 129 may be greater than the length between the welding point and the lower end of the electrode assembly at the time of receiving the electrode assembly in the can.

Figure 10:
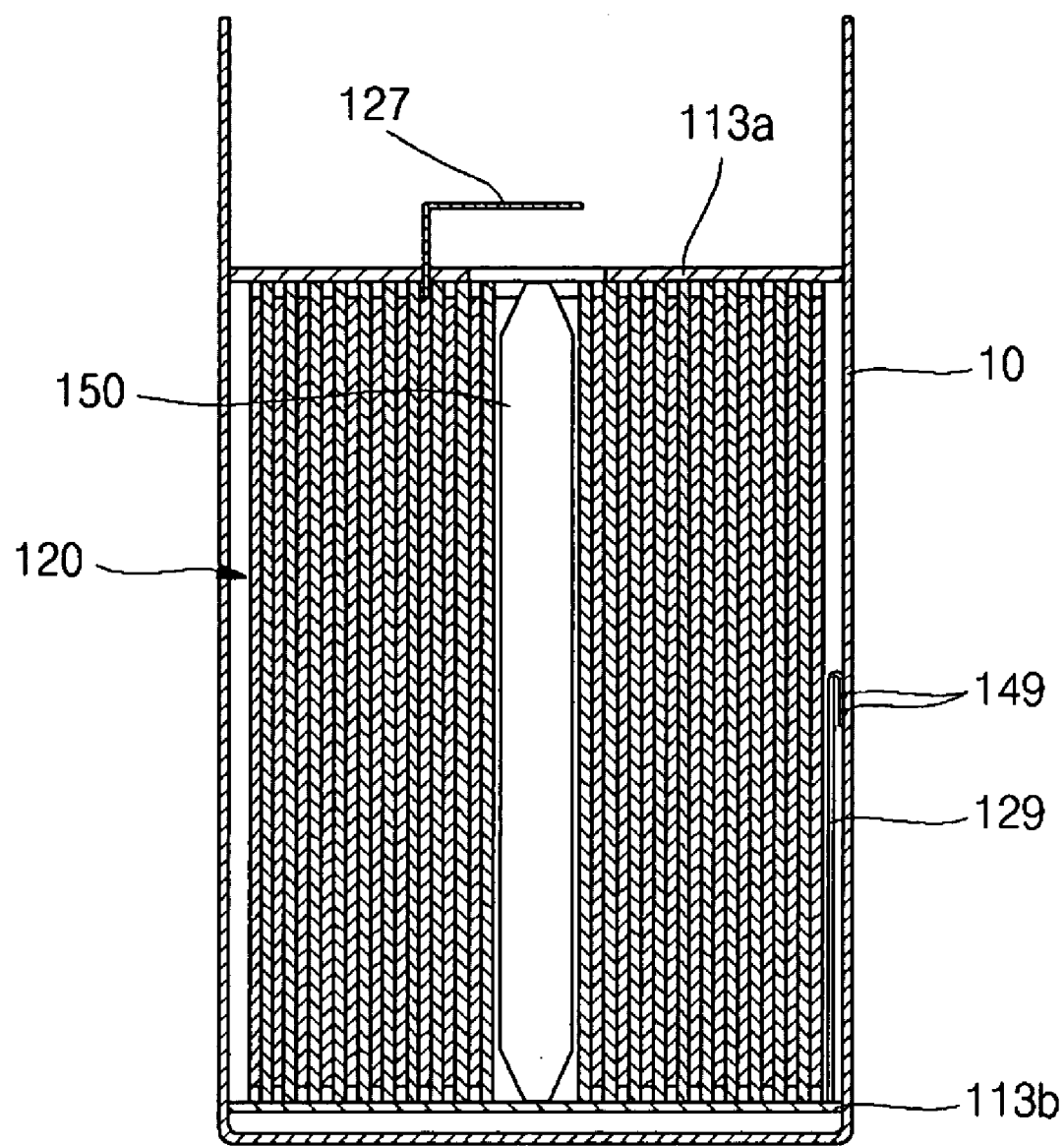

FIG. 10 is a cross-sectional view illustrating a case wherein a center pin 150 is provided in the central space of the electrode assembly according to yet another embodiment of the present invention. As shown in FIG. 10, since the welding does not need to be carried out using the central space of the electrode assembly, the lower insulating plate 113b does not contain a hole.

In the rechargeable battery according to the present invention, the welding strength between the bottom surface of the can and the downward electrode tap is enhanced, the resistance of the electrical connection portion is low to reduce the external internal resistance of the rechargeable battery and the charging and discharging efficiency and the amount of discharge is enhanced.

Specifically, the present invention reduces the likelihood that the electrode assembly will rotate due to external forces and thus, the welding between the bottom surface of the can and the downward electrode tap, is more likely to be maintained. Thus, the reliability of the rechargeable battery is enhanced.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined by the appended claims, and all variations within the scope of the claims will be understood to be included in the present invention.

What is claimed is:

1. A rechargeable battery comprising:
an electrode assembly comprising a first electrode and a second electrode, and a separator between the first electrode and the second electrode, the electrode assembly having a first electrode tap on the first electrode and a second electrode tap on the second electrode;
a can housing the electrode assembly; and
a cap assembly sealing an opening of the can and having a gasket to insulate the cap assembly from the can,
wherein the first electrode tap is fixed to the can and wherein the first electrode tap is folded in a configuration such that the first electrode tap contacts itself.

2. The rechargeable battery according to claim 1, wherein the first electrode tap is folded at least twice such that the first electrode tap forms three layers wherein each of the layers contacts an adjacent one of the layers.

3. The rechargeable battery according to claim 1, wherein the first electrode tap is fixed to an interior of the can at two or more points.

4. The rechargeable battery according to claim 1, wherein the can has a cylindrical shape.

5. A rechargeable battery comprising:
an electrode assembly comprising a first electrode and a second electrode, and a separator between the first electrode and the second electrode, the electrode assembly having a first electrode tap on the first electrode and a second electrode tap on the second electrode;
a can housing the electrode assembly; and
a cap assembly sealing an opening of the can and having a gasket insulating the cap assembly from the can,
wherein the first electrode tap has a substantially planar surface fixed to the can by at least two welds and wherein the first electrode tap is folded such that it contacts itself.

6. The rechargeable battery according to claim 5, wherein an end portion of the first electrode tap is substantially parallel to and fixed to a bottom surface of the can.

7. The rechargeable battery according to claim 6, wherein a length of the end portion of the first electrode tap between a side wall of the can and a side of the electrode assembly is greater than a length of the side wall and is less than twice the length of the side wall.

* * * * *